(12) United States Patent
Prince

(10) Patent No.: US 6,972,064 B2
(45) Date of Patent: Dec. 6, 2005

(54) METHOD OF FORMING LAMINAR STRUCTURES HAVING VARIABLE ANGLE TAPE WRAP

(75) Inventor: Andrew S. Prince, Huntsville, AL (US)

(73) Assignee: Alliant Techsystems Inc., Edina, MN (US)

( * ) Notice: Subject to any disclaimer, the term of this patent is extended or adjusted under 35 U.S.C. 154(b) by 373 days.

(21) Appl. No.: 10/279,281

(22) Filed: Oct. 23, 2002

(65) Prior Publication Data
US 2004/0081783 A1    Apr. 29, 2004

(51) Int. Cl.[7] ............................................. B65H 81/00
(52) U.S. Cl. ........................ 156/192; 156/189; 156/191
(58) Field of Search .............................. 156/189, 184, 156/191, 192, 195, 173, 175

(56) References Cited

U.S. PATENT DOCUMENTS

| | | | |
|---|---|---|---|
| 2,132,999 A * | 10/1938 | Topping | 52/557 |
| 3,081,705 A * | 3/1963 | Warnken | 156/195 |
| 3,095,156 A * | 6/1963 | Warnken | 156/184 |
| 3,402,085 A * | 9/1968 | Trimble | 156/189 |
| 3,633,631 A | 1/1972 | Hatch | |
| 3,701,704 A * | 10/1972 | Dervy | 156/297 |
| 3,707,415 A * | 12/1972 | Golladay et al. | 156/169 |
| 3,875,837 A * | 4/1975 | Dussaud | 83/46 |
| 3,960,626 A | 6/1976 | Casadevall | |
| 4,137,949 A | 2/1979 | Linko, III et al. | |
| 4,384,454 A | 5/1983 | Engl | |
| 4,790,898 A * | 12/1988 | Woods | 156/166 |
| 5,359,850 A | 11/1994 | Prescott | |
| 5,645,219 A | 7/1997 | Miks et al. | |
| 5,816,993 A * | 10/1998 | Fowler et al. | 493/226 |
| 6,195,984 B1 | 3/2001 | Cornelius et al. | |
| 6,235,359 B1 | 5/2001 | Wilson et al. | |
| 6,308,408 B1 | 10/2001 | Myers et al. | |
| 6,330,792 B2 | 12/2001 | Cornelius et al. | |

* cited by examiner

Primary Examiner—Jeff H. Aftergut
(74) Attorney, Agent, or Firm—TraskBritt

(57) ABSTRACT

Composite laminar structures which exhibit nonlinear surfaces and which exhibit a variable ply angle relative to a defined axis and methods of forming the same are disclosed. A change in ply angle may be induced by the formation of a ramp structure, such as by the introduction of one or more adjacent or periodically placed plies of varied width. Varied width plies may be introduced by cutting or trimming the width of a nominal width ply during lay-up of the composite material. In another embodiment, the ramp structures may be formed by introducing multiple sections of composite material, each of which exhibits a substantially serpentine profile along an edge thereof so as to define a plurality of fingers extending transversely relative to the respective length of each section. The plurality of sections may then be layered adjacent to one another, or periodically dispersed, with each respective set of fingers being offset relative to the set of fingers of a next closest layer.

14 Claims, 7 Drawing Sheets

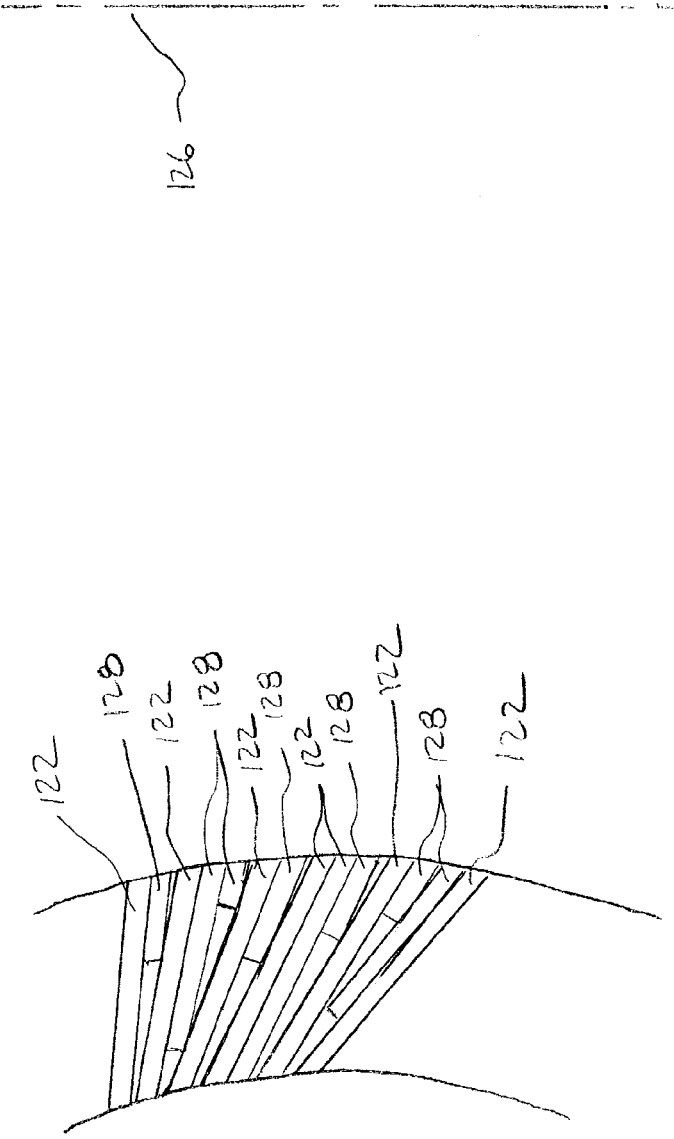

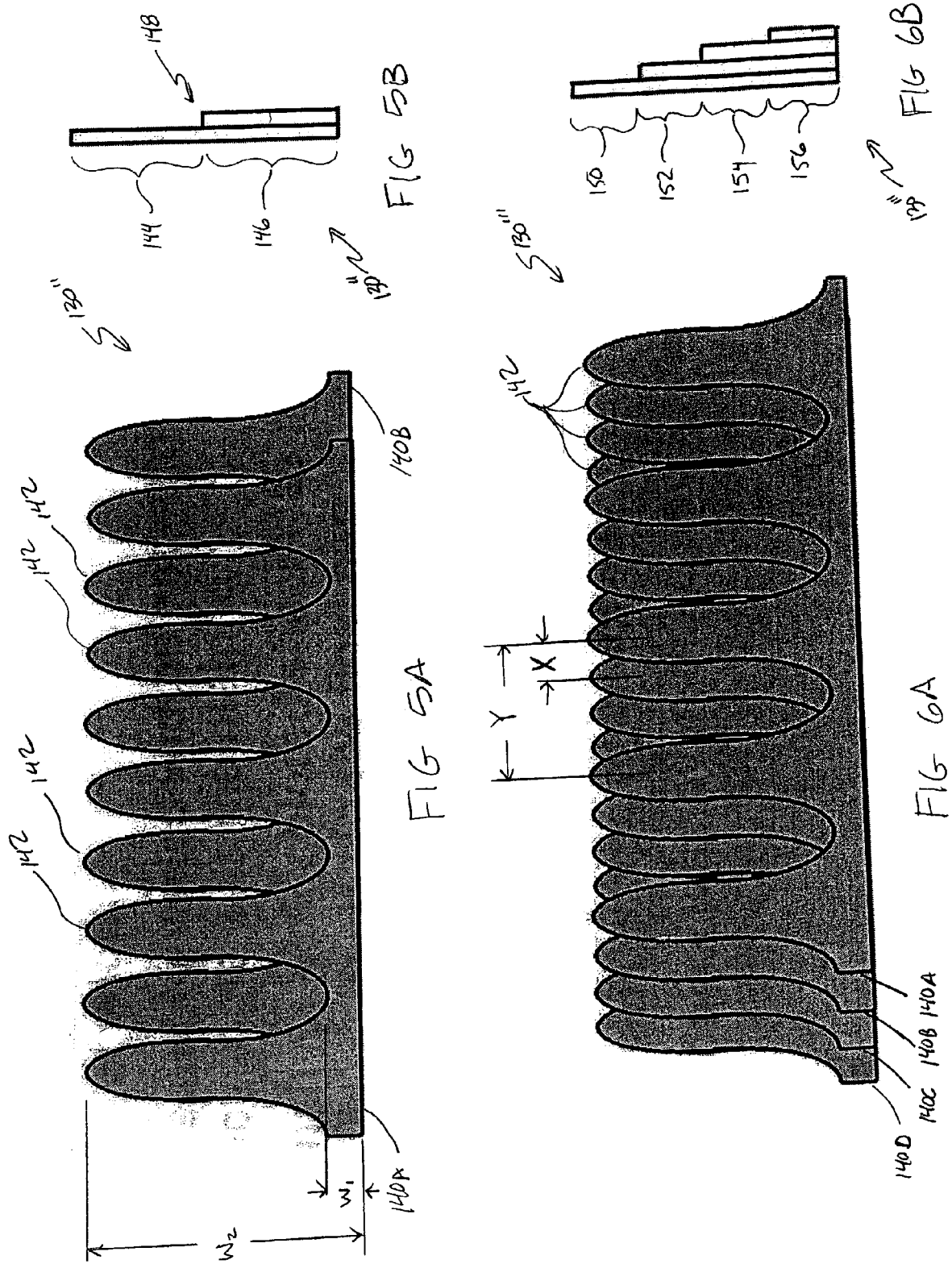

METHOD OF FORMING LAMINAR STRUCTURES HAVING VARIABLE ANGLE TAPE WRAP

STATEMENT OF GOVERNMENT RIGHTS

The United States Government has certain rights in the following invention under contract NAS8-97238 with Thiokol, Inc., now Alliant Techsystems, Inc.

BACKGROUND OF THE INVENTION

1. Field of the Invention

The present invention relates generally to laminar composite structures such as, for example, ablative coatings and ablative structures and, more specifically, to such structures which incorporate a variable angle tape wrap relative to a defined axis so as to maintain the angle of a given tape or ply at a specified angle relative to an associated tangent of the resulting surface geometry of the structure being formed.

2. State of the Art

Composite materials are often used to form ablative coatings or structures, referred to generally herein as ablative structures. Such ablative structures are conventionally used to dissipate thermal energy therefrom so as to protect the vehicle or structure in which they are incorporated from exceeding a specified temperature and thereby prevent temperature-induced failure of the vehicle or structure. An exemplary use of ablative materials includes the forming of structures, or the coating of specified surfaces for various components, associated with aerospace vehicles including both internal and external components of such vehicles.

The ablation of such coatings or structures is a known phenomenon by which energy incident upon an ablating material is dissipated through vaporization of the material rather than conversion of the energy into heat. Thus, during exposure to the heat energy, the material of the ablative coating or structure is eroded away through vaporization, thereby dissipating the incident heat energy by converting the solid material into vaporous matter.

For example, ablative coatings are conventionally utilized as heat shields for exposed surfaces of aerospace equipment such as rockets, missiles, space shuttles and similar vehicles. The ablative material serves to protect the structure from high thermal energy experienced due to high velocity conditions such as, for example, during launch or during re-entry into the earth's atmosphere.

Ablative materials are also used to line the nozzles of rockets such as solid rocket motors. When employed in such a manner, the ablative material serves to protect the nozzle during the exhaust of high temperature gases therethrough.

One conventional manner of forming ablative nozzle liners includes wrapping a plurality of plies of a carbon cloth phenolic (CCP), or other prepreg material, about a mandrel to form a layered structure. After removal from the mandrel, the layered structure is cured and consolidated. The consolidated structure may be machined or otherwise prepared so as to fit within, and be bonded to, the interior surface of the nozzle.

However, liners constructed in the above-described manner may experience "pocketing" or "ply lifting" during exposure of the liner to the flame and exhaust gases during ignition of a rocket and combustion of the rocket fuel. Such phenomena result in accelerated erosion and unpredictable char of the ablative material, thus hampering the overall performance of the rocket motor.

It has been recognized that the application angle of the individual plies of the ablative material used in forming the liner has a substantial effect on the phenomena of ply lifting and pocketing. For example, it has been determined that ply lifting and pocketing are substantially decreased when the ablative material is applied with the individual plies being oriented constantly at an optimum angle with respect to the heated surface of the liner itself. However, the ablative material is conventionally applied by wrapping the material, conventionally in tape form, circumferentially about a mandrel at a fixed angle relative to a defined axis such as the centerline of the liner. The conventional wrapping of plies at a fixed angle relative to a defined axis, coupled with the fact that most nozzles, and thus their associated liners, include convex and/or concave surfaces, results in a plurality of plies within the structure which fail to maintain the optimum angle with respect to the resulting heated surface of the liner.

For example, referring to FIG. 1, a portion of an ablative liner 10 for a rocket nozzle is shown. The ablative liner 10 is formed of a plurality of plies 12 of a CCP or other appropriate ablative material. It is noted that, for purposes of clarity, cross-hatching is not used in depicting the cross-sectional area of the plurality of plies 12.

The ablative liner 10 includes an exterior surface which is intended to be the heated surface 14 during the ignition of an associated rocket motor and combustion of its associated fuels. The heated surface 14 includes a convex geometry such as, for example, one might see in the throat region of a rocket nozzle as will be appreciated by those of ordinary skill in the art.

At a first end 16 of the heated surface 14, the plies 12 are oriented at a first angle, for example, approximately 45° to the heated surface 14. More specifically, a ply 12A at the first end 16 is oriented at an angle of approximately 45° to an associated tangent 18A of the heated surface 14 at the first end 16. However, because of the geometry of the heated surface 14, and because the plies 12 have been applied at a fixed angle relative to a centerline 20 of the ablative liner 10 (which is also the centerline of a mandrel on which the liner is formed), the plies 12 at a second end 22 of the heated surface 14 are oriented at an angle which substantially deviates from the desired 45° orientation.

In other words, a ply 12B spaced further towards the second end 22 of the heated surface 14 is oriented at an angle substantially greater than 45° to a tangent 18B of the heated surface 14 at the second end 22. Indeed, depending on the geometry of the ablative liner 10, the angle of a given ply may approach 90° relative to an associated tangent, at which angle pocketing becomes more pronounced. A similar result may occur with other geometries, including, for example, a convex geometry. Furthermore, in some geometries, the plies 12 may change angles, relative to a tangent of the heated surface 14, from, for example, 45° towards 0°, at which angle ply lifting becomes more pronounced.

Thus, a nozzle liner having a heated surface geometry which features any curves or changes in angle relative to its centerline, and which is formed through continuous wrapping at a fixed ply angle, is likely to experience some degree of ply lifting and pocketing during ignition of the rocket motor.

Some efforts have been made to tailor the angle of the plies depending on their respective location within a nozzle. For example, U.S. Pat. No. 6,330,792, issued Dec. 18, 2001, and U.S. Pat. No. 6,195,984, issued Mar. 6, 2001, both to Cornelius et al., describe a process of forming an ablative liner for a rocket nozzle. The Cornelius patents disclose the formation of a first segment of the nozzle liner, extending approximately from the exhaust end of the nozzle to near the throat prior to substantial constriction thereof, with the plies being wrapped about a mandrel at a specified angle relative to the axis of the mandrel. The first section is then cured and the terminating end of the section is machined to a specified angle, different than that of the ply angle exhibited within the first formed section.

A second section of the liner is then formed by wrapping additional plies from the machined end of the first section to approximately the constricted portion of the throat. The ply angle for the second section is determined by the angle of the first section's machined end. The second section is cured and its terminating end is machined at a new angle, different from that of the ply angle exhibited within the second formed section.

The process thus continues with the forming of the liner, section by section, with each new section being cured and machined to effect a change of angle in the plies for any new section to follow. However, the process described by Cornelius requires a relatively complex fabricating process which includes laying up the plies of tape, individually curing each section and machining the terminating end of each cured section. Additionally, there may be issues of integrity due to the individual curing of each segment or section of the liner and subsequent bonding together of such segments due to the discontinuity of the material. In other words, individual segments are bonded together solely by the matrix material due to the discontinuity of fibers therebetween.

Furthermore, while the Cornelius patents allow for a limited number of changes in the ply angle, each section of the liner is actually being formed with the plies being wrapped or laid-up at a fixed angle relative to the centerline of the mandrel. In other words, while ply angles change from section to section, the ply angles remain fixed within each given section. Thus, with a curved geometry, the liner will, as a practical matter, continue to have a number of plies which vary from an optimally specified angle.

In view of the shortcomings in the art, it would be advantageous to provide an ablative coating or structure and a method of forming such a coating or structure which allow for continuous variability in the ply angles of the coating or structure relative to a specified axis. Additionally, it would be advantageous to provide such a structure and method which enable substantially all of the plies to be positioned and oriented at a specified angle relative to the intended heated surface or, more specifically, to an associated tangent of the intended heated surface.

BRIEF SUMMARY OF THE INVENTION

In accordance with one aspect of the present invention, a method is provided for forming a laminar structure. The method includes providing a substantially continuous length of composite tape, wherein the composite tape exhibits a specified nominal width. The substantially continuous length of composite tape is wrapped about a mandrel to form a structure having a plurality of laminar plies. The initial ply of the wrap about the mandrel is oriented at a first specified angle relative to a centerline of the mandrel. As the tape is wrapped about the mandrel, a change in the cross-sectional angle of the composite tape, relative to the centerline, may be induced from one ply to another ply other than by reference to the shape of the mandrel.

The change in angle between plies may be effected by building or introducing a ramp structure within the laminar structure amongst individual plies. For example, a ramp structure may be introduced by varying the width of the composite tape as it is wound around the mandrel such that one or more plies having a width different than the nominal width are disposed between two plies of nominal width. In another example, a ramp structure may be introduced which includes a plurality of sections of composite tape which each exhibit a substantially serpentine profile along an edge thereof. The serpentine profile may define a set of fingers extending transversely relative to the respective length of a given section. The plurality of sections may then be disposed adjacent to each other in an overlaying fashion with the set of fingers of one section being laterally offset, in a direction along the length of the respective section, relative to the set of fingers on an adjacent section of composite tape.

In accordance with another aspect of the invention, a method of forming an ablative structure is provided. The method includes laying up a continuous length of composite tape material in a laminar manner to define an intended heat-receiving surface of the ablative structure wherein at least a portion of the intended heat-receiving surface exhibits a nonlinear cross-sectional geometry as taken parallel to a defined centerline of the ablative structure. The plurality of plies is oriented such that each ply is substantially at a predefined cross-sectional angle relative to an associated tangent of the intended heat-receiving surface. The method may further include introducing or building ramps within the structure in a manner such as is described herein.

In accordance with another aspect of the present invention, an ablative structure is provided. The ablative structure includes a plurality of plies of a composite tape material which is continuously laid-up in a laminar manner to define an intended heat-receiving surface. The intended heat-receiving surface exhibits a nonlinear surface geometry relative to a defined centerline of the ablative structure. Each of the plurality of plies is substantially oriented at a predefined cross-sectional angle relative to an associated tangent with the intended heat-receiving surface.

The ablative structure may further include ramps which are formed within the structure to assist in maintaining the angle of individual plies substantially at a predefined angle. The structure may further be configured as a nozzle liner wherein the intended heat-receiving surface includes a relatively constricted throat section.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 3C is a detailed view of a portion of the ablative liner of FIG. 3A in accordance with another embodiment of the present invention;

FIGS. 5A and 5B are elevational front and side views, respectively, of tape plies used in forming an ablative structure according to an embodiment of the present invention; and FIGS. 6A and 6B are elevational front and side views, respectively, of tape plies used in forming an ablative structure according to an embodiment of the present invention.

DETAILED DESCRIPTION OF THE INVENTION

Figure 1:
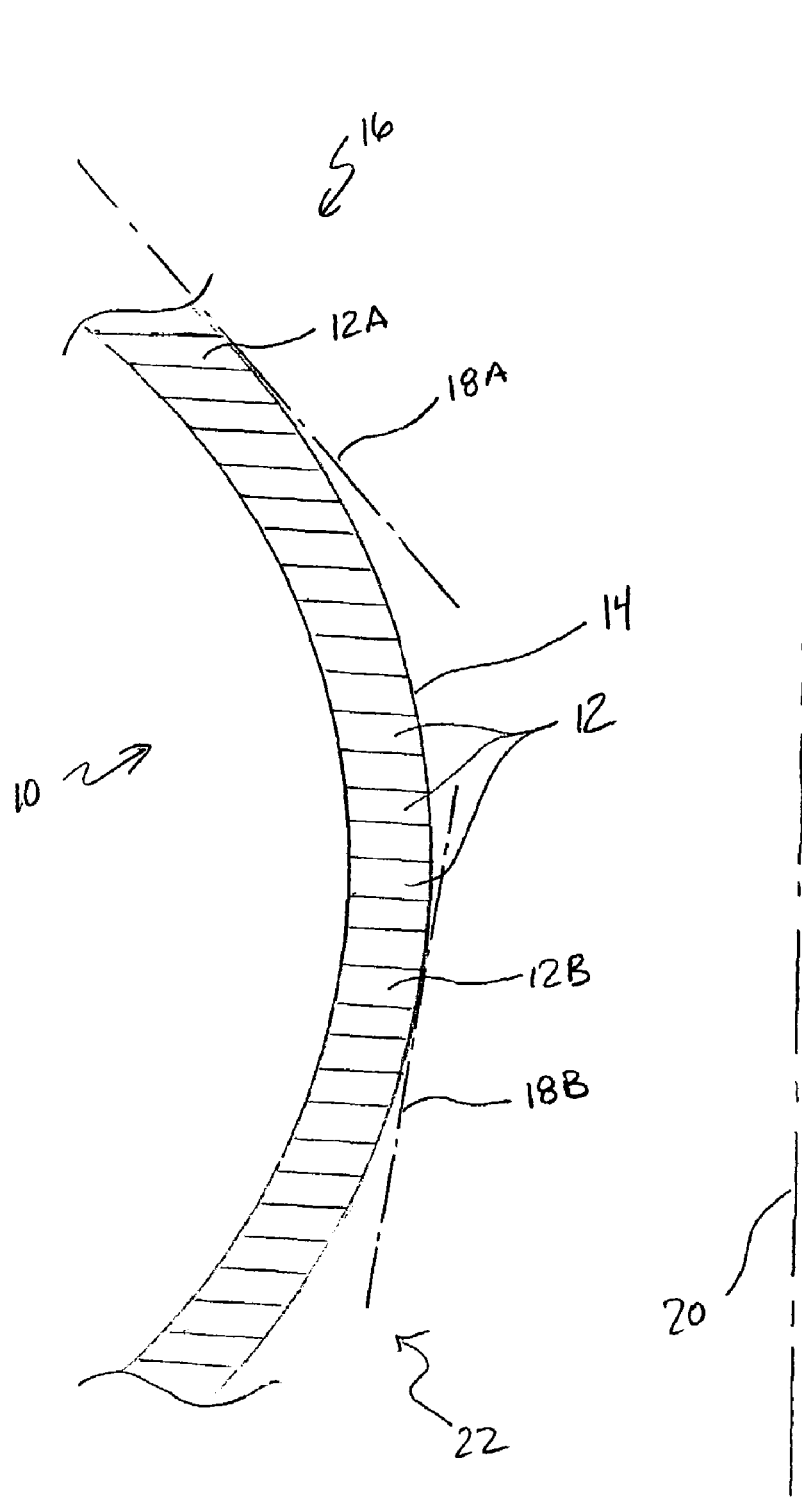
FIG. 1 is a cross-sectional view of a portion of a prior art ablative liner for a rocket nozzle.
Figure 2:
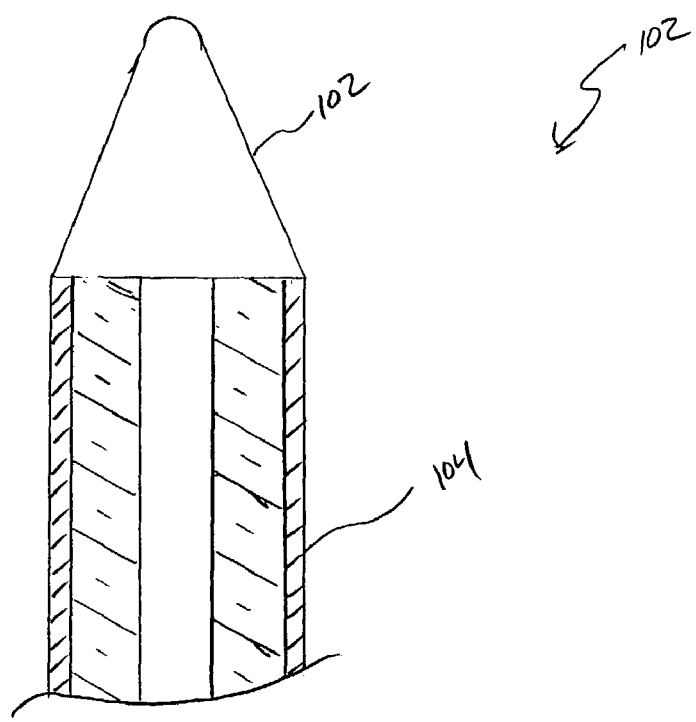
FIG. 2 is a cross-sectional view of a rocket motor including a nozzle having an ablative liner according to one embodiment of the present invention.
Figure 2:
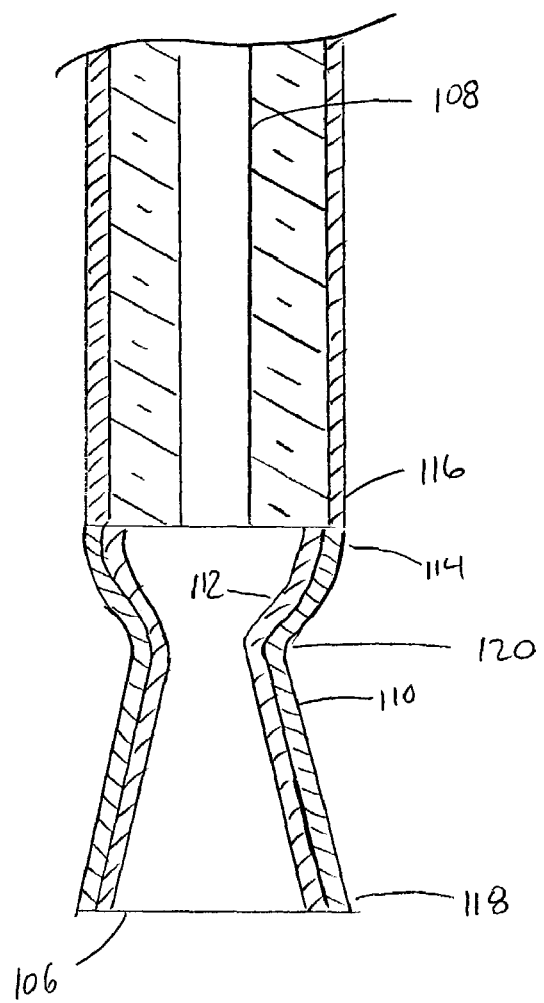

Referring to FIG. 2, an exemplary rocket motor 100 is shown including generally a nose cone 102, a body portion or fuselage 104, and a nozzle 106. The rocket motor 100 includes a source of fuel such as, for example, a solid fuel source 108, although the present invention may be practiced with other types of rockets and rocket motors.

The nozzle 106 includes an outer shell structure 110 and an ablative liner 112 disposed therein adjacent to an interior surface of the shell structure 110. The nozzle 106 includes a combustion end 114 coupled with the aft end 116 of the rocket motor's body portion 104, an exhaust end 118 and a throat section 120 between the combustion end 114 and the exhaust end 118, which is of a relatively constricted diameter as compared to the combustion and exhaust ends 114 and 118.

Figure 3A:
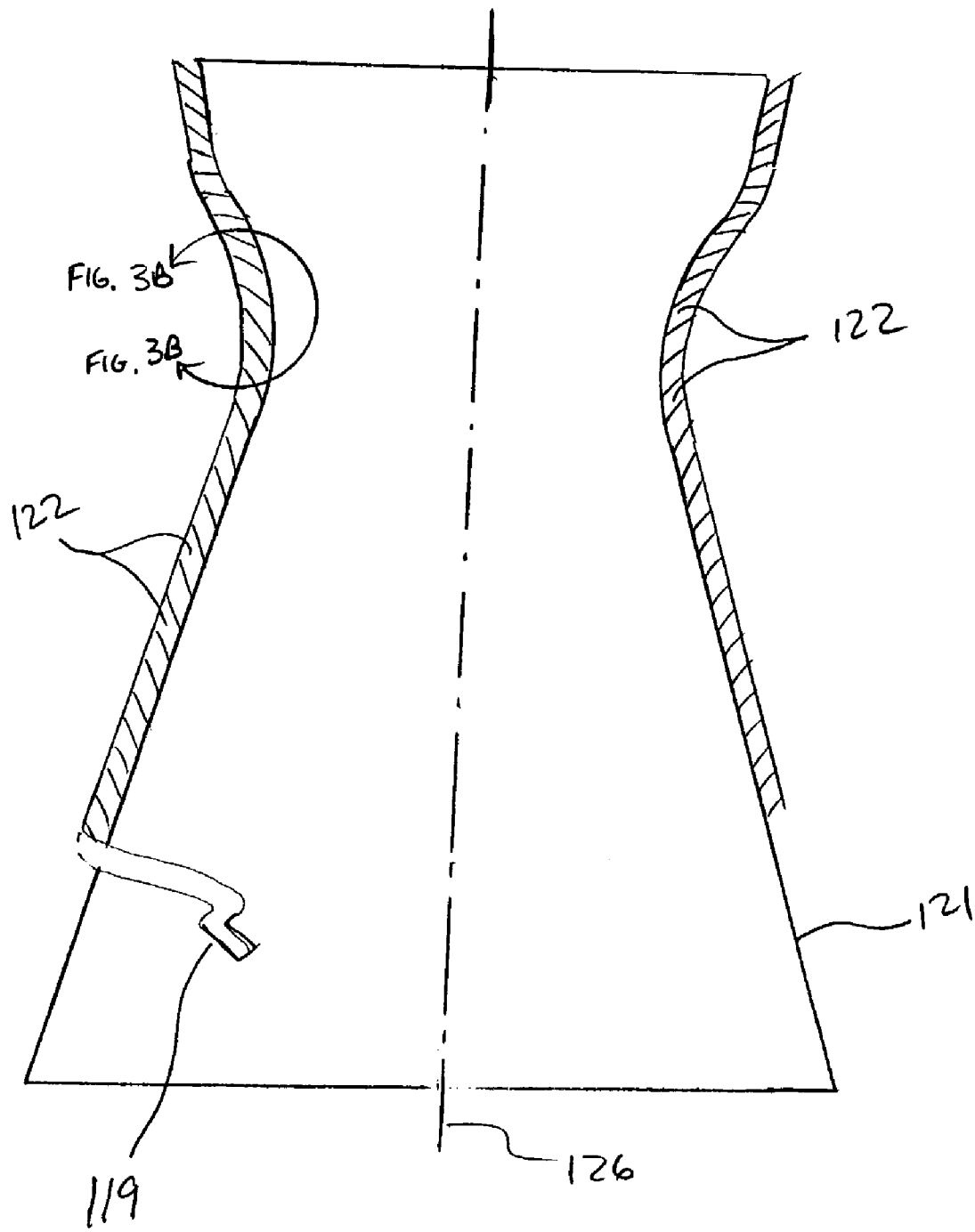
FIG. 3A is a partial cross-sectional view of an ablative liner being formed on a mandrel according to an embodiment of the present invention.

Referring to FIG. 3A, the ablative liner 112 may be formed of a prepreg material such as, for example, a carbon cloth phenolic (CCP) material, by wrapping a continuous length 119 of the CCP or other ablative material, in tape form, circumferentially about a mandrel 121 such that individual wraps or plies 122 of the material are built up in a laminar manner. It is noted that FIG. 3A and the subsequently described FIGS. 3B–6B do not include cross hatching in the cross-sectional views of the various plies (e.g., plies 122) for purposes of clarity. It is also noted that, while the present invention is discussed in exemplary embodiments of ablative structures such as an ablative liner 112, other composite and laminar-type structures may be formed in accordance with the present invention.

Figure 3B:
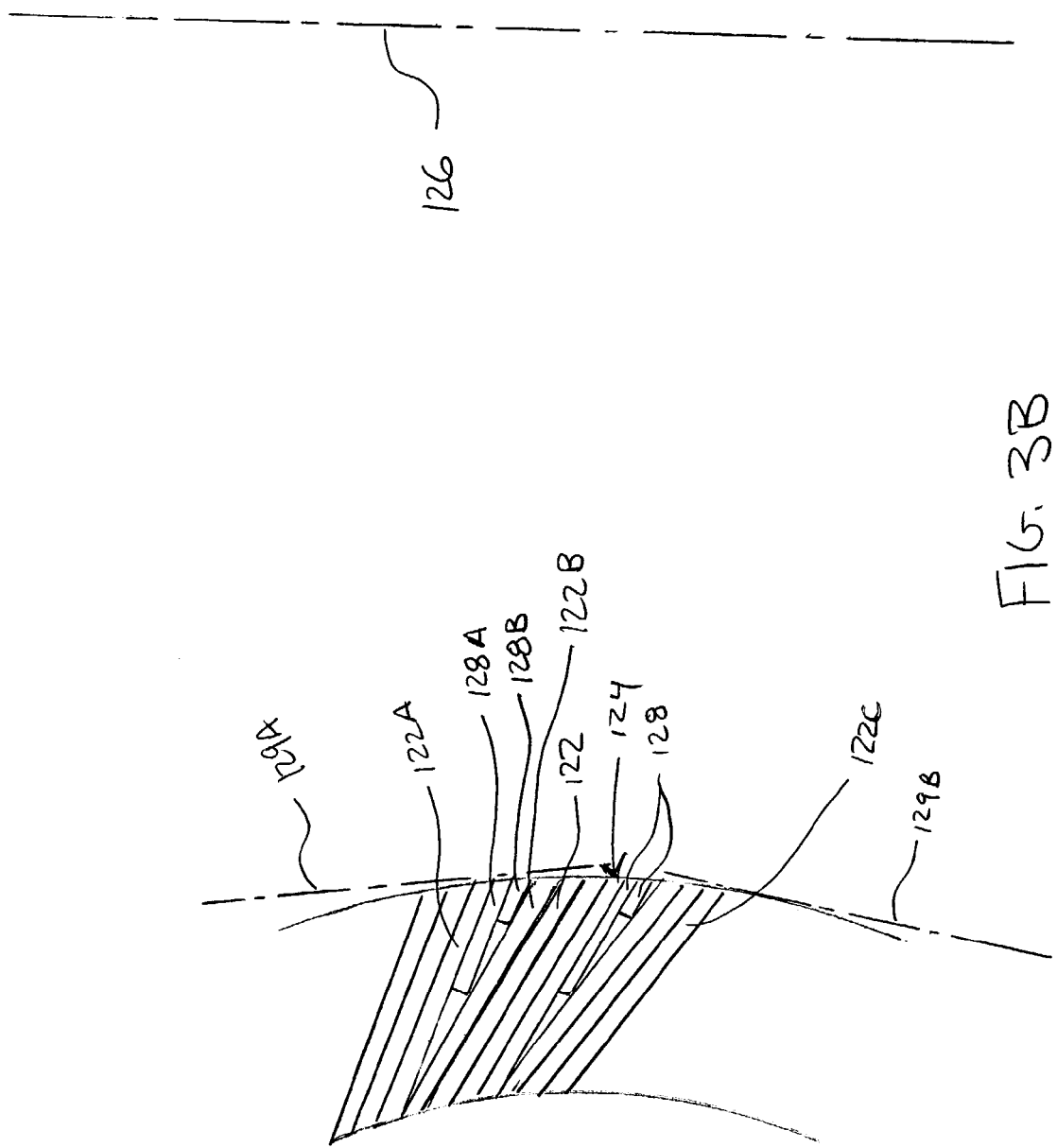
FIG. 3B is a detailed view of a portion of the ablative liner of FIG. 3A in accordance with an embodiment of the present invention.

Referring to FIG. 3B, a detailed view of a portion of the ablative liner 112, as indicated in FIG. 3A, is shown including a portion which is located in the throat section of the ablative liner 112. The heated surface or, more aptly, the intended heat-receiving surface 124 of the ablative liner 112 exhibits a generally nonlinear cross-sectional geometry relative to the longitudinal centerline 126 of the ablative liner 112 (see also FIG. 3A). As discussed above herein, conventional techniques of forming an ablative liner would require that the plies be oriented at a fixed cross-sectional angle relative to the centerline 126, resulting in nonoptimal angles of the plies relative to the intended heat-receiving surface 124. However, the present invention allows for continuously variable ply angles throughout a given geometry.

Still referring to FIG. 3B, the individual plies 122 of the ablative liner 112 have been wrapped about a mandrel 121 (FIG. 3A) to form a laminar structure. However, at various locations, plies of strategically varied width (see plies 128) have been laid up among the individual plies 122 of nominal or conventional width. The interspersement of plies 128 having varied widths allows for an effective "ramp structure" to be built into the laminar structure which forms the ablative liner 112, thereby causing a desired shift in the cross-sectional angle of the plies 122, relative to the centerline 126, as one traverses longitudinally along the intended heat-receiving surface 124 of the ablative liner 112.

For example, plies 122A and 122B are of a specified nominal width while one or more, in this example two, varied width plies 128A and 128B are disposed therebetween. It is additionally noted that the two varied width plies 128A and 128B are also of different widths as compared to each other. Such a combination of the two variable width plies 128A and 128B produces a ramp structure which effects a desired change in angle from the first adjacent nominal width ply 122A to the next adjacent nominal width ply 122B. Such a process allows for a controlled change, which may be as gradual as desired, in the cross-sectional ply angle relative to the centerline 126.

Stated otherwise, the ablative liner 112, or other structure formed according to the present invention, results in a laminar structure wherein the individual plies 122 are substantially maintained at a specified cross-sectional angle with respect to a tangent associated with each ply at the intended heat-receiving surface 124 of the ablative liner 112. Thus, for example, ply 122A is oriented substantially at a specified or predetermined cross-sectional angle with respect to a tangent 129A associated with the ply 122A at the intended heat-receiving surface 124. Additionally, ply 122C, while oriented at a different cross-sectional angle than ply 122A relative to the centerline 126, is oriented at substantially the same cross-sectional angle with respect to its associated tangent 129B at the intended heat-receiving surface 124 of the ablative liner 112.

In one example, varied width plies 128 are utilized to maintain each of the nominal width plies 122 at a cross-sectional angle of substantially 45° relative to an associated tangent of the intended heat-receiving surface 124. Utilizing varied width plies 128 to vary the cross-sectional angle (relative to the centerline 126) throughout the ablative liner, the nominal width plies 122 may be kept at the specified cross-sectional angle within a specified tolerance of, for example, ±5° relative to an associated tangent of the intended heat-receiving surface 124.

It is noted that ramp structures of various sizes and configurations may be incorporated to effect angle changes of varied magnitudes among the plies 122 as needed or desired. Thus, while the above example discusses the formation of a ramp structure utilizing two varied width plies 128A and 128B, numerous plies of varied width may be used in any desired sequence to build a relatively larger ramp structure effecting a larger. substantially instantaneous change of angle within the structure. Also, a single varied width ply may be employed to effect a smaller change in ply angle. Furthermore, it is noted that the actual width(s) of the varied width plies 128 may be strategically designed to help influence the magnitude of change in the ply angle.

Referring briefly to FIG. 3C, another exemplary embodiment is shown wherein varied width plies 128 are generally of random frequency and width relative to the nominal width plies 122. Thus, an angle change need not be effected by a series of adjacent varied width plies 128 which sequentially and continually decrease in width—or increase in width, as the case may be. Rather, the varied width plies 128 may be placed periodically among the nominal width plies 122 and at random widths in order to effect a desired rate of turn and/or in order to obtain a desired level of uniformity. Such randomness in the width and frequency of placement of the varied width plies 128 may help to avoid resin rich edges, provide greater uniformity and improve the overall quality of the final structure.

Figure 4B:
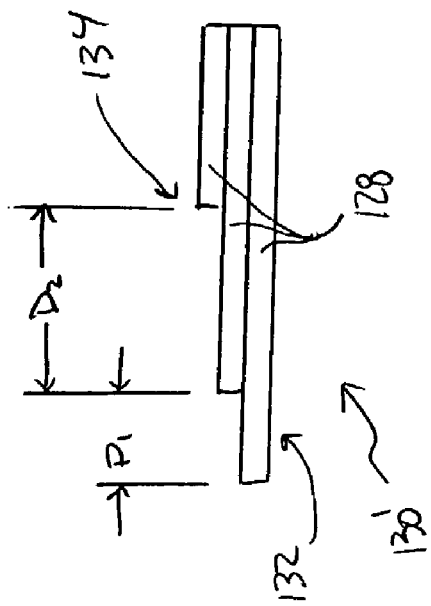
FIGS. 4A and 4B show elevational views of ramped sections of plies which may be used according to an embodiment of the present invention.
Figure 4A:
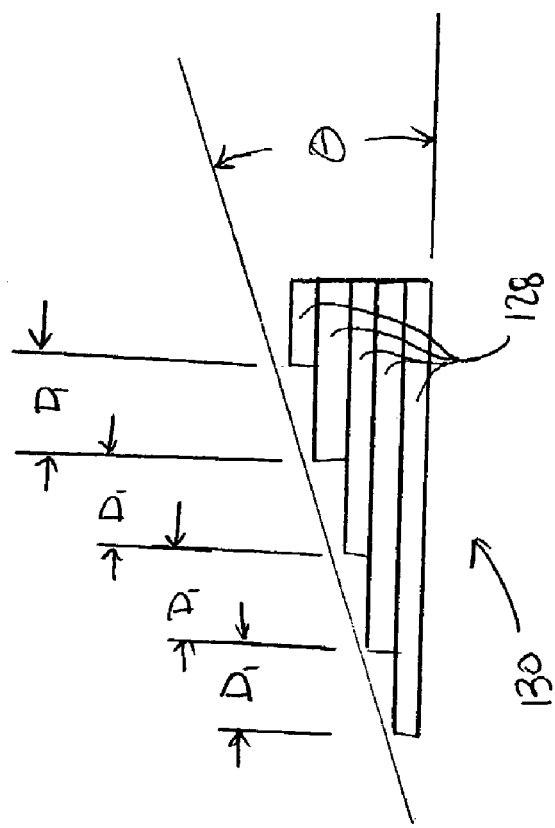

Referring now to FIG. 4A, an exemplary ramped structure 130 is formed from a plurality of varied width plies 128. The varied width plies 128 exhibit a differential in width $D_1$ between adjacent plies. By varying this differential $D_1$ the angle θ may be altered. Thus, if the differential $D_1$ is increased, the ramp structure will exhibit a relatively smaller angle θ and vice versa.

Referring now to FIG. 4A, an exemplary ramp structure 130 is formed from a plurality of varied width plies 128. The varied width plies 128 exhibit a differential in width $D_1$ between adjacent plies. By varying this differential $D_1$, the angle θ may be altered. Thus, if the differential $D_1$ is increased, the ramp structure will exhibit a relatively smaller angle θ and vice versa.

Referring briefly to FIG. 4B, it is also noted that a ramp structure 130' may be formed wherein the differential in width between adjacent varied width plies 128 need not be constant at each step. Thus, there may be a first differential $D_1$ of a first magnitude between two adjacent plies 128 in one portion 132 of the ramp structure 130' and a second differential $D_2$ of a another magnitude between two adjacent plies 128 in another portion 134 of the ramp structure 130'. Additionally, as noted above, a ramp structure may also include a single varied width ply 128 disposed between two nominal width plies 122.

As noted above, an ablative structure such as the ablative liner 112 shown and described in FIGS. 3A–3C may be formed by continuously wrapping the tape or individual plies 122 and 128 about a mandrel 121 in a laminar fashion. The change in ply angle, through the introduction of varied width plies 128, may be effected by slitting, cutting, or trimming the width of the tape "on the fly" just prior to the tape's application to the mandrel 121. Thus, an ablative structure may be formed having a continually varied or adjusted cross-sectional ply angle, relative to the defined centerline 126, by cutting tape to a desired width during application thereof to form ramp structures, as needed, during the wrapping process. Such a process is advantageous as it does not require the wrapping process to stop and start numerous times in order to perform associated curing and/or machining processes and the effective width of a ply may be reduced from the nominal width to a varied width in a continuous manner, linearly or nonlinearly, rather than in an abrupt stepped manner. Accordingly, integrity of the resulting laminate structure may be enhanced through a reduction of potential void space.

Further, as noted above, the continual and gradual nature of the process allows for more comprehensive control of the ply angle. Thus, rather than changing the cross-sectional ply angle three or four times, such as by forming individual sections or segments with each section having a newly defined but constant cross-sectional ply angle, the cross-sectional ply angle is continuously varied according to the present invention to ensure that each ply is substantially at an optimal cross-sectional angle relative to a tangent of the intended heat-receiving surface. Furthermore, the process according to the present invention is advantageous in that the ablative liner 112, or other laminar structure, may be cured and consolidated as a unitary member rather than separately curing and/or consolidating individual sections which are subsequently assembled together and which lack fiber continuity therebetween.

Referring now to FIGS. 5A and 5B, a ramp structure 130" is shown for use in altering the ply angle of an ablative structure according to another embodiment of the present invention. The ramp structure 130" includes a plurality of serpentine plies 140A, 140B which exhibit an undulating profile with respect to their respective widths. Thus, for example, referring to the top serpentine ply 140A of FIG. 5A, the width of the ply 140A alternately varies between a minimum width $W_1$ and a maximum width $W_2$ such that a repeating pattern of transversely extending fingers 142 is effectively defined along the length of the ply 140A.

In forming the ramp structure 130", the top serpentine ply 140A overlays the second serpentine ply 140B in an offset manner such that the fingers 142 of the top serpentine ply 140A intermesh, or are effectively interdigitized, with the fingers 142 of the second serpentine ply 140B. In other words, if the undulating profile of the serpentine plies 140A and 140B was described as being substantially sinusoidal (although, it is noted that such a description is only exemplary), the sinusoidal patterns of the two plies 140A and 140B might be described as being 180° out of phase with one another.

The overlaying and interdigitized relationship of the two serpentine plies 140A and 140B results in a cross-sectional profile of a ramp structure 130" such as is shown in FIG. 5B. The fingers 142 of the two plies 140A and 140B intermesh to form a first section 144 which is effectively one ply thick, while a second section 146 is two plies thick wherein portions of each ply 140A and 140B are stacked upon each other in a laminar manner.

It is noted that, while FIG. 5B shows a "step" 148 between the first section 144 and the second section 146, it is somewhat exaggerated for purposes of illustration. Rather, the transition between the two sections 144 and 146 is actually more continuous and gradual than that which is illustrated. A ramp structure 130" having a more continuous and gradual transition between ply thicknesses may be helpful in smoothing out ply distortions in the resulting structure and provides smoother transitions when used to change the cross-sectional ply angles in a laminar structure.

Referring now to FIGS. 6A and 6B, another ramp structure 130''' is shown which is formed with serpentine-type plies 140A–140D. The ramp structure 130''' is generally similar to that which is shown and described with respect to FIGS. 5A and 5B except that more plies 140A–140D are being used and they are positioned differently with respect to each other. For example, rather than the fingers 142 of the top ply 140A being intermeshed or interdigitized with the fingers 142 of the next underlying ply 140B, the fingers 142 of adjacent plies (e.g., plies 140A and 140B, plies 140B and 140C, etc.) are offset from one another a specified lateral distance X.

Thus, in the exemplary embodiment of FIGS. 6A and 6B, which includes four overlaying plies 140A–140D, the offset distance X may be, for example, one fourth (¼) of the distance Y between two adjacent fingers 142 of a given ply (e.g., ply 140A) and, thus, using the prior phase angle analogy, each ply is 90° out of phase with the next adjacent ply. It is noted, however, that the offset distance X need not be inversely related to the number of plies being used and that the offset distance may be varied to specify the angle of a given ramp structure.

Referring to FIG. 6B, the resulting ramp structure 130''' includes a first section 150 having the equivalent thickness of a single ply, a second section 152 having the equivalent thickness of two plies, a third section 154 having the equivalent thickness of three plies and a fourth section 156 having a thickness of four plies. Again, it is noted that while the transitions between adjacent sections 150, 152, 154 and 156 are shown as steps for purposes of illustration, the transitions are actually more continuous and gradual.

It is noted that the width of the individual fingers 142, as well as spacing therebetween, may be a function of one or more variables including, for example, the desired rate of change in the cross-sectional angle, the desired thickness of the final structure, and/or the diameter of the mandrel or structure to which the tape is being applied. Furthermore, the width of the fingers 142 and the spacing therebetween need not be dependent on each other. In other words, one embodiment might include relatively wide fingers 142 with relatively narrow spacing therebetween, while another embodiment might include relative narrow fingers 142 with relatively wide spacing therebetween.

The application of the varied width plies 128, or the serpentine plies 140A–D, may be effected by utilizing one or more rolls of such plies and introducing them into the structure (i.e., between nominal width plies) as required to effect a desired cross-sectional angle change. Indeed, multiple rolls of varied width plies 128 may be used wherein ply width is varied from one roll to another. In one embodiment, the varied width plies 128 (or serpentine plies 140A–D) may be fed through a cut, clamp and restart mechanism. In another embodiment, the varied width plies 128 (or serpentine plies 142) may be hand fed into the structure as it is being formed.

As noted previously above, the application of varied width plies 128 may also be effected by using a trim feature wherein the nominal width ply is trimmed prior to placement on the structure, thereby forming a varied width ply, from the nominal width ply, on demand. Such a trimming apparatus might include, for example, a platen, over which a nominal width ply is passed, and a knife member which is selectively actuated to trim the ply to a desired width. The trimming apparatus might further include a scraper or other mechanism to assist in removing the trimmed or unwanted section away from the newly formed varied width ply.

Regardless of the manner of application, it may also be desirable to control the angle of any apparatus used to apply the plies (e.g., a roller or platen used to press the plies into place) such that constant pressure is applied across the cross-sectional width of each ply of the structure being formed. Thus, as the cross-sectional angle of the plies is varied, it may be desirable to monitor (or predict) such change in angle and likewise cause the angle of an applying roller or platen to vary in a congruous manner.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of forming a laminar structure comprising:
providing a length of substantially continuous composite tape, the composite tape exhibiting a specified nominal width;
wrapping the substantially continuous composite tape about a mandrel including initiating the wrapping of the mandrel by orienting the substantially continuous composite tape at a first specified cross-sectional angle relative to a centerline of the mandrel and continuing to wrap the mandrel such that the substantially continuous composite tape forms a plurality of laminar plies; and
inducing at least one change in a cross-sectional angle of the substantially continuous composite tape other than in response to mandrel shape relative to the centerline of the mandrel while wrapping the substantially continuous composite tape about the mandrel including arranging the plurality of laminar plies to comprise a first ply, a second ply adjacent the first ply, and a third ply adjacent to the second ply, wherein a portion of a first surface of the first ply is in contact with at least a portion of a first surface of the second ply, a second portion of the first surface of the first ply is in contact with a portion of a first surface of the third ply, and wherein at least a portion of a second, opposing surface of the second ply is in contact with a second portion of the first surface of the third ply.

2. The method according to claim 1, wherein inducing at least one change in the cross-sectional angle of the substantially continuous composite tape relative to the centerline of the mandrel includes forming a ramp structure between at least two plies of the first, second and third plies.

3. The method according to claim 2, wherein forming a ramp structure includes varying a width of the substantially continuous composite tape from its specified nominal width while it is being wrapped about the mandrel.

4. The method according to claim 3, wherein varying the width of the substantially continuous composite tape includes forming the second ply of the plurality of laminar plies to exhibit a first varied width.

5. The method according to claim 4, wherein varying the width of the substantially continuous composite tape further includes forming the third ply of the plurality of laminar plies to exhibit a second varied width different from the first varied width.

6. The method according to claim 2, wherein forming a ramp structure includes forming at least a section of the first ply and at least a section of the second ply to each exhibit a serpentine profile.

7. The method according to claim 6, further comprising forming the serpentine profile of the first ply to define a first set of fingers extending substantially transversely to a length thereof and forming the serpentine profile of the second ply to define a second set of fingers extending substantially transversely to a length thereof.

8. The method according to claim 7, further comprising orienting the at least a section of the first ply and the at least a section of the second ply, such that the first set of fingers is offset in a direction along the length of the composite tape relative to the second set of fingers.

9. The method according to claim 8, further comprising orienting the first set of fingers and the second set of fingers in a substantially interdigitized relationship.

10. The method according to claim 1, wherein providing a length of substantially continuous composite tape includes providing a substantially continuous length of carbon cloth phenolic tape.

11. The method according to claim 1, further comprising forming the laminar structure as an ablative structure.

12. The method according to claim 11, further comprising:
defining an intended heat-receiving surface of the ablative structure; and
varying a surface geometry of the intended heat-receiving surface relative to the centerline of the mandrel.

13. The method according to claim 11, further comprising forming the ablative structure as a nozzle liner.

14. The method according to claim 13, further comprising forming the nozzle liner to include a throat section between a first longitudinal end and a second longitudinal end thereof.

* * * * *